US009815423B2

(12) United States Patent
Flaster (10) Patent No.: US 9,815,423 B2
(45) Date of Patent: Nov. 14, 2017

(54) MOTOR VEHICLE STATE CONTROL SYSTEM AND METHOD

(71) Applicant: International Truck Intellectual Property Company, LLC, Lisle, IL (US)

(72) Inventor: Adam Daniel Flaster, Williamston, MI (US)

(73) Assignee: International Truck Intellectual Property Company, LLC, Lisle, IL (US)

(*) Notice: Subject to any disclaimer, the term of this patent is extended or adjusted under 35 U.S.C. 154(b) by 262 days.

(21) Appl. No.: 14/777,574

(22) PCT Filed: Mar. 22, 2013

(86) PCT No.: PCT/US2013/033529
§ 371 (c)(1),
(2) Date: Sep. 16, 2015

(87) PCT Pub. No.: WO2014/149056
PCT Pub. Date: Sep. 25, 2014

(65) Prior Publication Data
US 2016/0039369 A1 Feb. 11, 2016

(51) Int. Cl.
*B60R 16/033* (2006.01)
*B60R 25/10* (2013.01)
*H04B 5/00* (2006.01)

(52) U.S. Cl.
CPC .......... *B60R 16/033* (2013.01); *B60R 25/10* (2013.01); *H04B 5/0062* (2013.01); *H04B 5/0068* (2013.01)

(58) Field of Classification Search
CPC ....... B60R 16/03; B60R 16/033; B60R 25/10; H04B 5/0062; H04B 5/0068
USPC ...................................... 307/9.1, 10.1, 10.7
See application file for complete search history.

(56) References Cited

U.S. PATENT DOCUMENTS

| 6,671,646 | B2 | 12/2003 | Manegold et al. |
| 7,362,229 | B2 | 4/2008 | Brinton et al. |
| 7,944,345 | B2 | 5/2011 | Brinton et al. |
| 8,106,757 | B2 | 1/2012 | Brinton et al. |
| 9,108,528 | B2* | 8/2015 | Yang ................. B60K 6/365 |
| 2002/0089434 | A1 | 7/2002 | Ghazarian |

(Continued)

OTHER PUBLICATIONS

PCT Search Report from parent Application WO/2014/149056.
PCT International Preliminary Report on Patentability from parent Application WO/2014/149056.

*Primary Examiner* — John Poos
(74) *Attorney, Agent, or Firm* — Jeffrey P. Calfa; Mark C. Bach (57) ABSTRACT

A vehicle power system includes a plurality of power distribution divisions, a rechargeable energy storage system, switching devices for connection of the power distribution divisions to the rechargeable energy storage system, a plurality of loads energized from the power distribution divisions, a control network including nodes for control over the loads and the switching devices, a mobile transponder and a transceiver which is connected to the controller area network and which provides for communicating with the transponder. Sensors monitored by the controller area network and proximity of the mobile transponder determine a state for vehicle power distribution system.

10 Claims, 10 Drawing Sheets

(56) References Cited

U.S. PATENT DOCUMENTS

| | | |
|---|---|---|
| 2005/0046584 A1 | 3/2005 | Breed |
| 2009/0093925 A1* | 4/2009 | Gumbel ................. B60Q 1/486 701/36 |
| 2011/0089758 A1* | 4/2011 | Kinser .................... B60L 1/003 307/10.1 |
| 2011/0246013 A1* | 10/2011 | Yee ..................... B60L 11/1859 701/22 |

* cited by examiner

MOTOR VEHICLE STATE CONTROL SYSTEM AND METHOD

BACKGROUND

Technical Field

The technical field relates generally to state control of electrical power distribution systems on motor vehicles, and more particularly, to a state control system for a high voltage power distribution system which anticipates operator operational demands based on driver location in the motor vehicle, driver movement proximate to the motor vehicle and location of the motor vehicle.

Description of the Technical Field

Electric and hybrid vehicles, particularly hybrid-electric vehicles, are increasingly common, particularly for buses and for commuter and urban delivery applications. The electrical power distribution systems for these vehicles usually include more than one high voltage electric power distribution sub-systems because, in part, high voltage power distribution reduces current losses. The power distribution sub-systems may operate at different nominal voltage levels and both direct current (DC) or alternating current (AC) sub-systems may be present.

Power is supplied to the high voltage electric power distribution sub-systems from the vehicle's rechargeable energy storage system (RESS). For an electric vehicle the RESS is the exclusive source of power during vehicle operation. The RESS is usually a substantial battery system, though it may be constructed in alternative forms, such as capacitors or even fuel cells. Contemporary RESS units, particularly those constructed from batteries, tend to exhibit a relatively low density energy storage in comparison to fossil fuels, and as a consequence, the all electric range of electric and hybrid vehicles is usually substantially less than it is for vehicles which burn fossil fuels.

Specialized switching devices such as contactors are used to control connection of the RESS to the high voltage electric power distribution sub-systems. Because closure of the contactors can produce a large current inrush to previously unenergized high voltage sub-systems, the power distribution system will often include a pre-charge resistor system. A plurality of contactors are provided which allow current to be routed through the pre-charge resistors to prevent an initial current surge from the RESS and to bypass the pre-charge resistors to reduce losses during operation. In this way initial power flow on power up is limited. The process of powering up can, however, take an appreciable amount of time to carry out.

Contemporary vehicles use distributed computer control over vehicle systems. This includes control over electrical power distribution. Distributed control includes system specific controllers such as: transmission controllers, engine controllers and motor controllers associated with the drive train; ancillary controllers such as used for power steering motors and the like; and, battery management systems associated with the RESS. The controllers are linked by wiring or optical cable for the exchange of data. The linkage is commonly operated in what is termed a controller area network (CAN) with the controllers providing network nodes. The network nodes/controllers are computers and thus they consume power. They also take appreciable time to boot up and shut down.

Keeping a power distribution system in a state of full readiness can be a substantial power drain on the RESS. Good energy management of the RESS calls for minimizing energy/power drains on the RESS to increase vehicle range. This in turn suggests that vehicle electric power distribution sub-systems could be powered down when not in use to avoid a drain on the RESS. The time taken to shut down and energize the power distribution sub-systems and to boot up on board computer are practical limitations on taking such steps, particularly on a vehicle used for small package delivery.

SUMMARY

A vehicle electrical energy/power distribution system includes a plurality of distribution divisions, a rechargeable energy storage system, a plurality of switching devices for selective connection of distribution divisions to the rechargeable energy storage system, a plurality of loads connected for energization to the distribution divisions, a mobile transponder, a controller area network including a plurality of nodes with control nodes for control over the plurality of loads and the plurality of switching devices, a mobile transponder and a transceiver which is connected to the controller area network and which provides for communicating with the transponder. There is a controller area network node connected for communication with a plurality of vehicle sensors which in turn are responsive to operator location in the vehicle and vehicle status. The transponder and transceiver cooperate to establish transponder distance from the vehicle. Each of several possible electrical power distribution system states are triggered based on proximity of a transponder and status of the sensors.

DETAILED DESCRIPTION

In the following detailed description, like reference numerals and characters may be used to designate identical, corresponding, or similar components in differing drawing figures. Furthermore, example sizes/models/values/ranges may be given with respect to specific embodiments but are not to be considered generally limiting.

Figure 1:
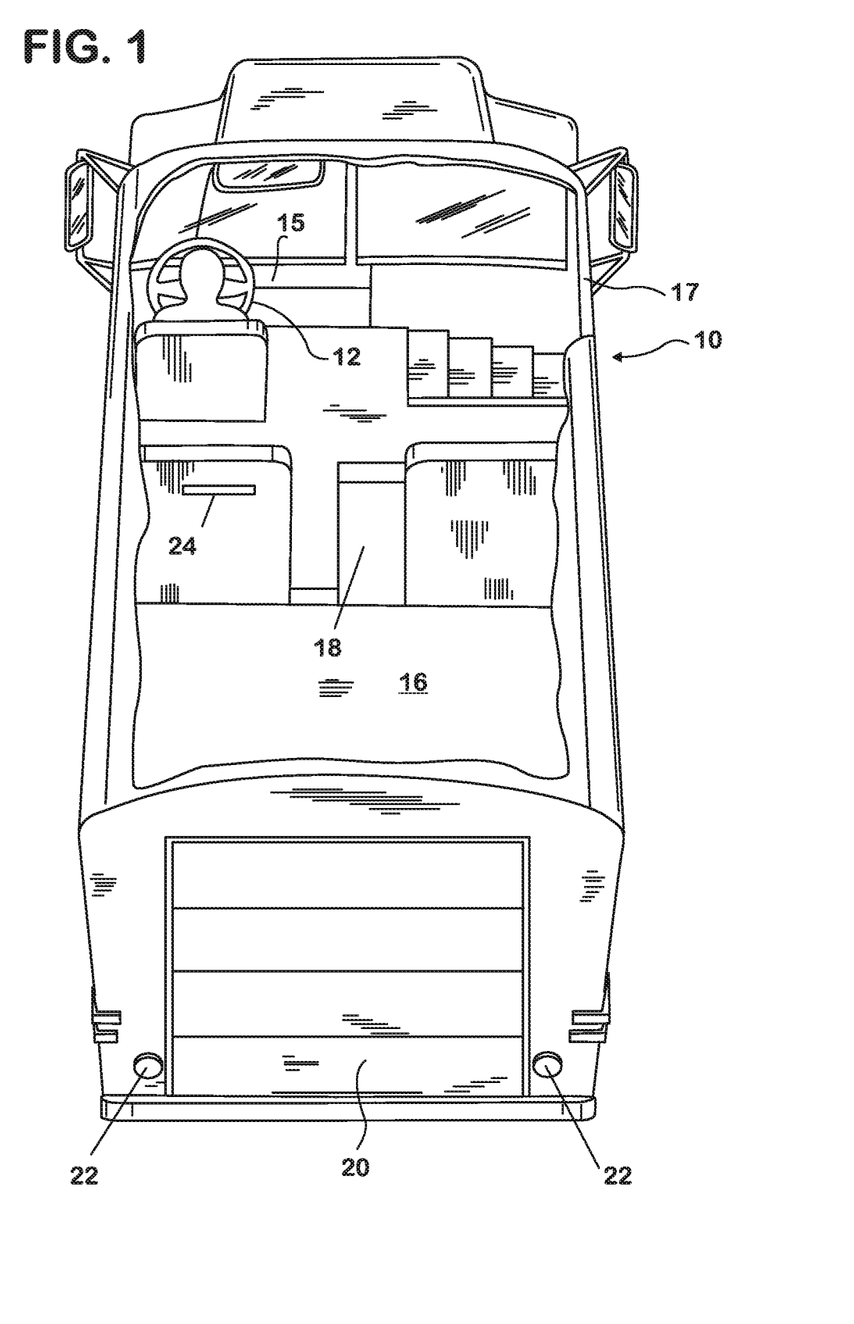
FIG. 1 is an illustration of a delivery vehicle.

Referring now to the drawings and in particular FIG. 1, a delivery vehicle 10 is illustrated. Delivery vehicle 10 is illustrated as a van type vehicle though other types of vehicles adapted for delivery purposes and indeed the teachings of this disclosure may be applied to a variety of types of vehicles including tractor and trailer combinations, buses and automobiles.

Delivery vehicle 10 is driven by an operator from an operator station 12 located facing an instrument and control panel 15. A sensor may be associated with the operator station 12 to indicate whether the operator station is occupied. Vehicle 10 is equipped with a door 17 by which the authorized operator may enter and depart the vehicle. A sensor switch may be used in conjunction with door 17 to indicate whether the door is open or closed. A cargo area 16 may be accessed from the front operator station 12 via a sliding door 18 or a rear tailgate 20. The cargo area may be illuminated by a skylight (not shown) in the roof and/or a work lamp 24 located in the cargo area 16. Lights 22 are shown illustrated at the rear of vehicle 10.

The driver of delivery vehicle 10 will come and go from the vehicle from time to time for various purposes, such as to complete a delivery, make a pick up, or when the vehicle is parked at location for loading or when out of immediate service. Delivery vehicle 10 incorporates a drive train which is based, at least in part, on electric motors for propulsion. An electrical system with high voltage power distribution potential is provided for powering the electrical motors. The electrical system of delivery vehicle 10 can be programmed to assume states which conserve power in response to various of these situations. State transitions are triggered in response to operator actions and movement and in response to vehicle location so that transitions between states are initiated, and may be completed, prior to driver operational demands on the vehicle or upon conclusion of operator operation demands.

Figure 2:
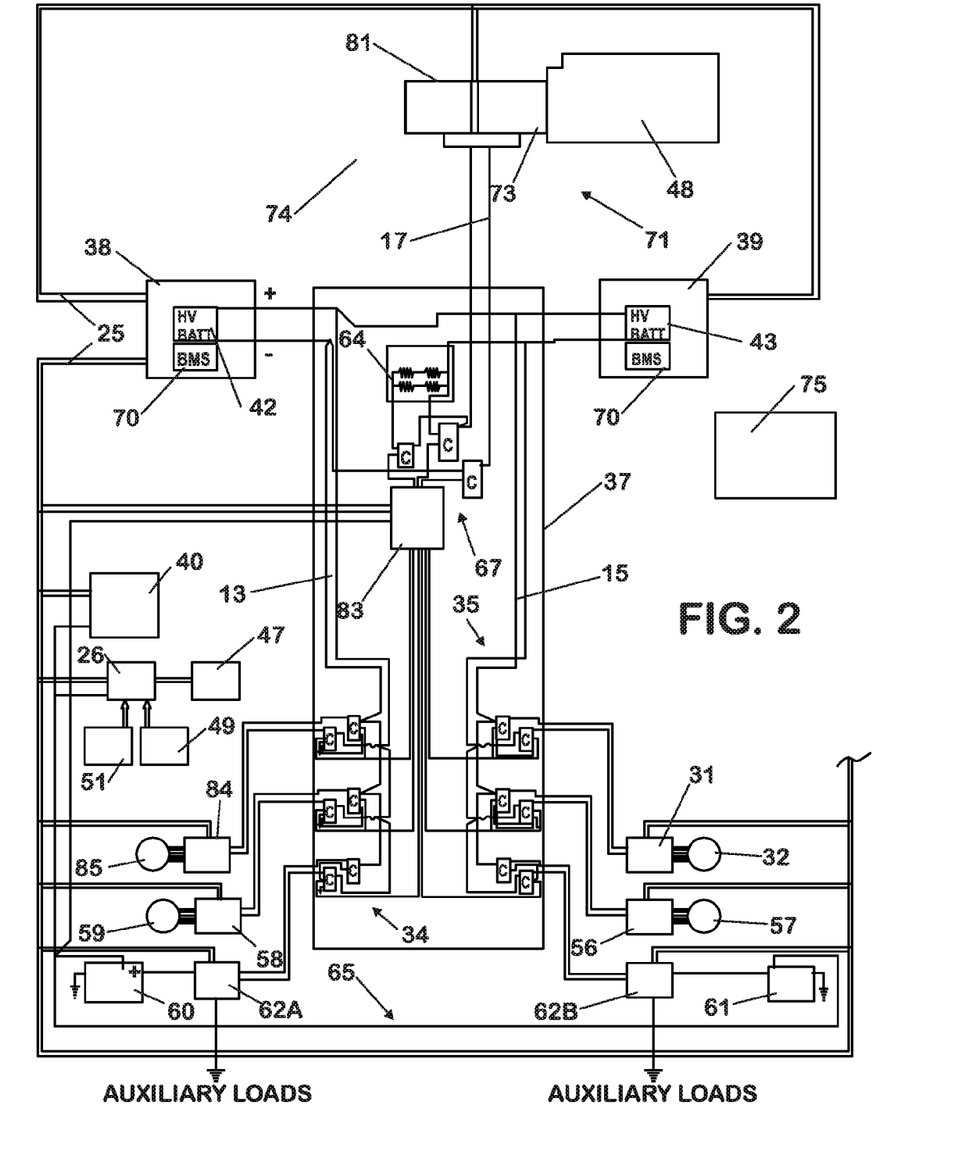
FIG. 2 is a high level schematic of the electrical system for a vehicle incorporating a rechargeable electrical storage system.

FIG. 2 is a high level schematic of a vehicle electrical system representative of one environment in which the teachings of the present disclosure may be applied. The vehicle electrical system is elaborated upon in the context of a drive train 71. The vehicle could be an all electric vehicle or provide alternative on-board mechanisms for recharging the vehicle RESS than an IC engine 48. Drive train 71 is illustrating incorporating a motor 81 for propulsion and the vehicle includes the RESS (here batteries boxes 38, 39) which can be used as a source of power for motor 81. Where drive train 71 is hybridized, a non-electric power source 48, such as an internal combustion (IC) engine, a gas turbine, a Stirling engine, or other power source, may be added as an option to drive a generator 73 and thereby support propulsion or to provide direct propulsion. A fuel cell may replace the combination of non-electric power source and generator, or where it is regenerative may serve as an RESS. Generator 73 provides one mechanism for recharging the vehicle RESS 38, 39. For vehicles where the RESS serves as a source of electrical power the hybrid traction motor 81 could be replaced with an electrical machine to provide regenerative braking and for recharging the vehicle RESS 38, 39.

In the system of FIG. 2 a high voltage distribution box 37 provides direct electrical connections from a vehicle RESS 38, 39 to each of three high voltage direct current (DC) power distribution sub-systems. The high voltage DC power distribution sub-systems operate at two distinct DC voltage levels. There is a 350 volt DC level supported by first and second ancillary systems buses 13 and 19. There is also a 700 volt DC feed line 21. A low voltage sub-system 65 is supported from the ancillary systems buses 13 and 19. A high voltage inverter/converter 46 provides an interface between the high voltage DC current feed line 21 and a three phase the alternating current (AC) sub-system associated with optional generator 73 and motor 81.

Control over power distribution is implemented using network data link 25 which provides data communication between the nodes of the network comprising ancillary controllers 34 and 35, an electronic system controller (ESC) 40 and slave elements of the ESC 40 such as a remote power module (RPM) 26, and controllers (not shown) for the vehicle drive train which may be drive train 71. Taken together these data links and nodes may be operated to implement controller area networks (CAN).

High voltage DC power distribution comes out of a high voltage distribution box 37. High voltage distribution box 37 houses first and second DC ancillary buses 13 and 19 and is the source of the 700 volt DC feed line 21. RESS 38, 39, include traction batteries 42, 43 which are electrically connected to first and second high voltage DC buses 13 and 19. Each of the traction batteries 42, 43 support a nominal potential of 350 volts. The negative and positive terminals of traction battery 42 are electrically connected to the two wires of bus 13, respectively, and the negative and positive terminals of traction battery. The positive terminal of traction battery 42 is electrically connected to the negative terminal of traction battery 43 to build a 700 volt in-series power source for DC feed line 21. The negative terminal of traction battery 42 is connected to one of connectors 67 through with it may be electrically connected to the converter/inverter 46. The positive terminal of high voltage traction battery 43 is connected to a pre-charge resistor block 64 and from there to one of connectors 67 for electrical connection to the inverter/converter 46. The electrical connection between the 700 volt DC feed 21 and the traction motor 81 is through the high voltage inverter/converter 46 which operates at 700 volts DC from a 700 volt direct current feed 21 side and at a high voltage, variable frequency, three phase alternating current on the traction motor side.

Whether current flows through the resistors of the pre-charge resistor block 64 depends upon the closed/open states of three contactors 67. Contactors' 67 states change more than once for a transition from a deenergized state to an energized state, first to interpose the resistor block 64 to limit current discharge from traction batteries 42 and 43 and later, during operation, to remove the resistor block from the circuit and reduce power loss. Contactors' 67 states are controlled by a high voltage distribution box controller 83 which communicates with ESC 40 over data link 25. Ultimately operation of the high voltage distribution box controller is controlled by instructions from the ESC 40.

High voltage distribution box controller 83 also controls the closed/open states of a plurality of ancillary systems contactors 34, 35 associated with ancillary systems buses 13, 19, respectively. The ancillary systems include diverse electrical loads including high voltage DC motors 32, 57, 59 and 85 which may be used to support power steering, air conditioning compressors, air pumps and the like and auxiliary system DC-DC converters 62A, 62B which supply DC power to an auxiliary power system 65. Contactors 34, 35 may, as allowed by the specific application, be open during a transition to limit current inflow.

Auxiliary DC power system 65 may represent a number of different system, such the electrical power distribution system for a trailer or low voltage components of vehicle such as delivery vehicle 10 where it could be the immediate, filtered power source for on-board electronics such as the nodes of the vehicle CAN network. A representative auxiliary DC power system 65 is represented here has comprising two storage batteries 60, 61. The power system 65 may be energized without closure of its associated ancillary systems contactors. When the contactors are closed the chassis batteries 60, 61 function as filters to stabilize low voltage system voltage. The low voltage power sub-system 65 supplies logic operating power to the nodes of the control system including ESC 40, ancillary motor controllers 31, 56, 58 and 84, RPM 26 and to the high voltage distribution box controller 83.

RESS 38 and 39 include battery management system (BMS) controllers 70 which report over hybrid CAN data link 25 on traction battery voltage and current flow into and out of the sub-packs.

The electrical power distribution system has a plurality of states related to which portions of the system are active or "hot" and which components can draw power. The power distribution system is a multi-division system which can be used with hybrid electric drive train 71 and to supply power to high voltage DC to ancillary loads such motors 32, 57, 59 and 85 and to DC/DC converters 62A-B.

Among the nodes coupled to the low voltage sub-system to support operation of its logic is RPM 26. RPM 26 is connected to at least two internal vehicle sensors used to indicate the location of a driver with respect to or in the vehicle. One sensor is a seat sensor 49 located proximate to or in the driver's station seat of the vehicle. Seat sensor 49 indicates whether the seat is occupied (or at least is supporting a load consistent with the seat being occupied). The second sensor is a door sensor 51 which indicates whether the door most likely used by a driver is opened or closed.

RPM 26 also communicates with a transponder such as a transponder 75 such as a long range radio identification (RFID) tag or other wireless device using a transceiver interrogator 47. The transponder 75 is uniquely identified and which may be assigned to an authorized operator of the vehicle. Distance between the transceiver 47 and the transponder 75 may be determined by the time delay between responses to periodic interrogation signals generated by the transceiver 47. transponder 75 may be either a passive (powered by the interrogation signal) or active (internal battery powered) device. Alternatives to using an RFID tag include optical devices such as infrared and ultraviolet transceivers.

The transceiver/interrogator 47 can be installed on vehicle 10 and permanently integrated into the vehicle 10 as shown. Alternatively a transceiver/interrogator 47 can be external, and permanently mounted at a location such as a loading dock. Two way communications between the transceiver/interrogator 47 and a two way communication device installed on the vehicle or the transceiver/interrogator 47 may be plugged into a vehicle which has docked at the loading dock. In this way the vehicle proximity boundary and the within delivery area boundary can be located and even shaped to a specific zone which may or may not include the vehicle. Determination of a state/mode for the vehicle can be executed externally to the vehicle and transmitted to the vehicle, or the vehicle can be programmed to operate on the inputs.

Figure 3:
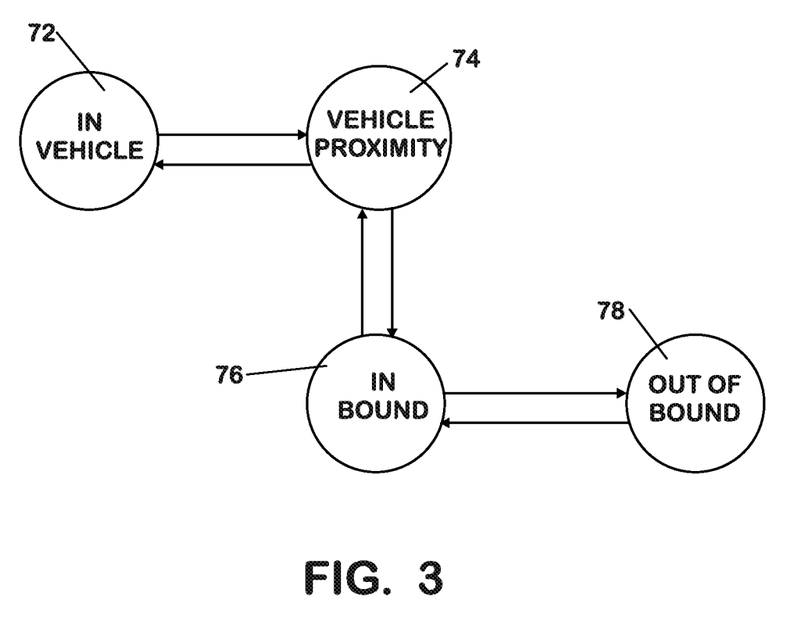
FIG. 3 is a state machine.

A state or mode of a system may be considered to be a condition of existence that a system or component of a system may be in. FIG. 3 illustrates four states/modes of the electrical power distribution system which the system may assume in response to driver position, RFID tag location and sensor status. For convenience sake these states/modes are tagged here by reference to presumed driver location, changes in which drive transitions between the states. The four states/modes are identified in that sense as: 1) In vehicle mode/state 72; 2) Vehicle proximity mode 74; 3) Inside delivery boundary mode 76; and, 4) Outside delivery boundary mode 78. State/mode transitions occur only with immediately adjacent modes, that is transitions can occur between modes 72 and 74, between modes 74 and 76, and between modes 76 and 78.

Figure 4:
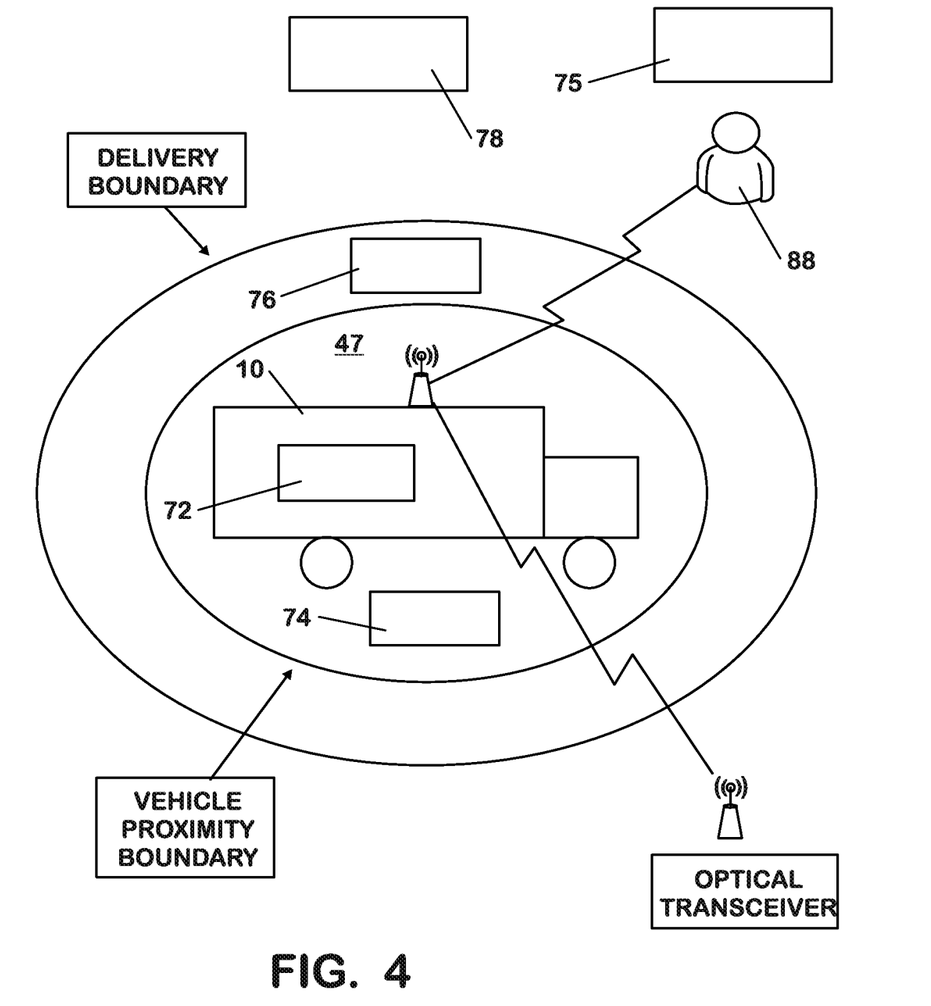
FIG. 4 is a map illustrating boundaries associated with particular states of the electrical power system of FIG. 2.
Figure 5:
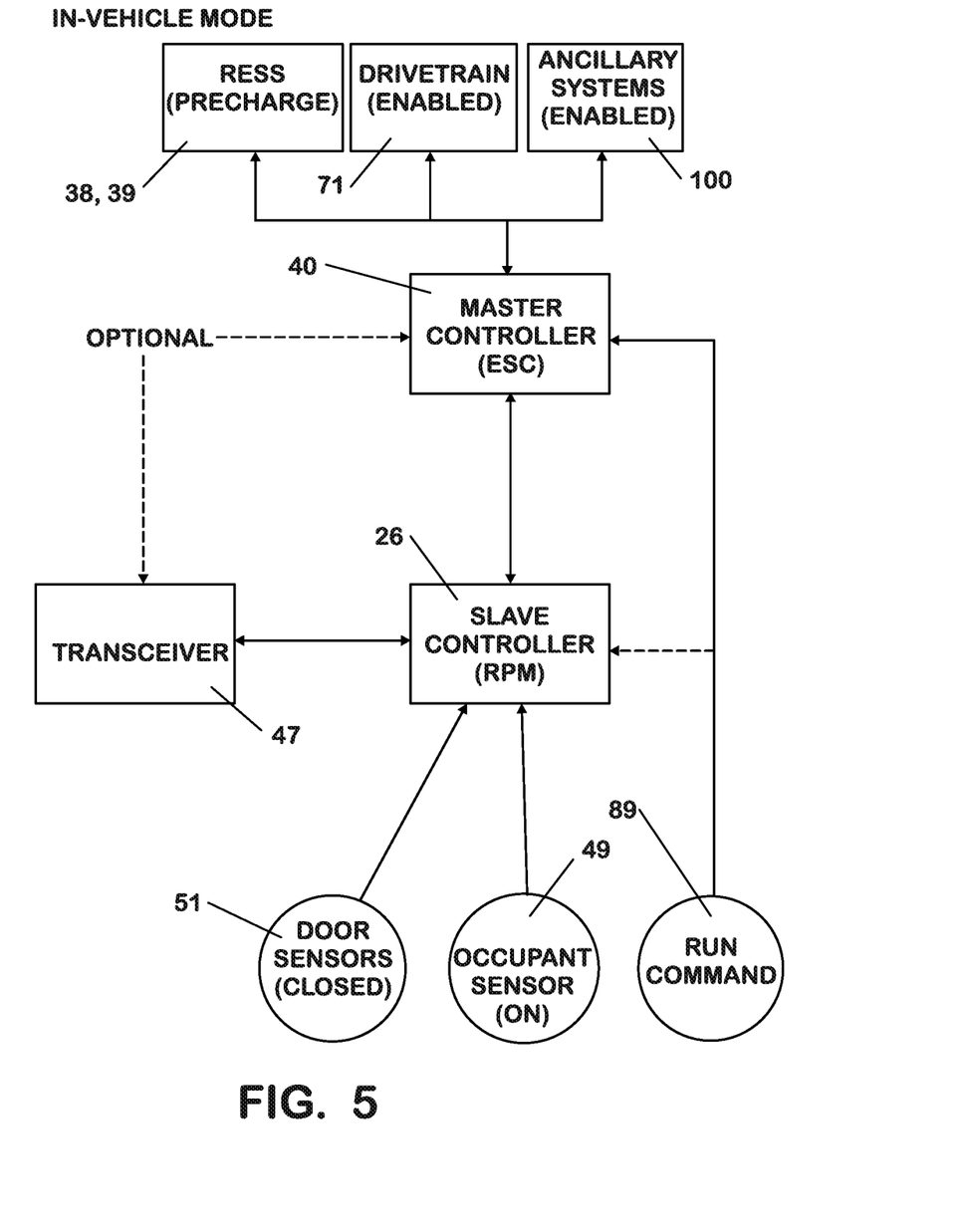
FIG. 5 is a data flow definition of an in-vehicle mode.
Figure 6:
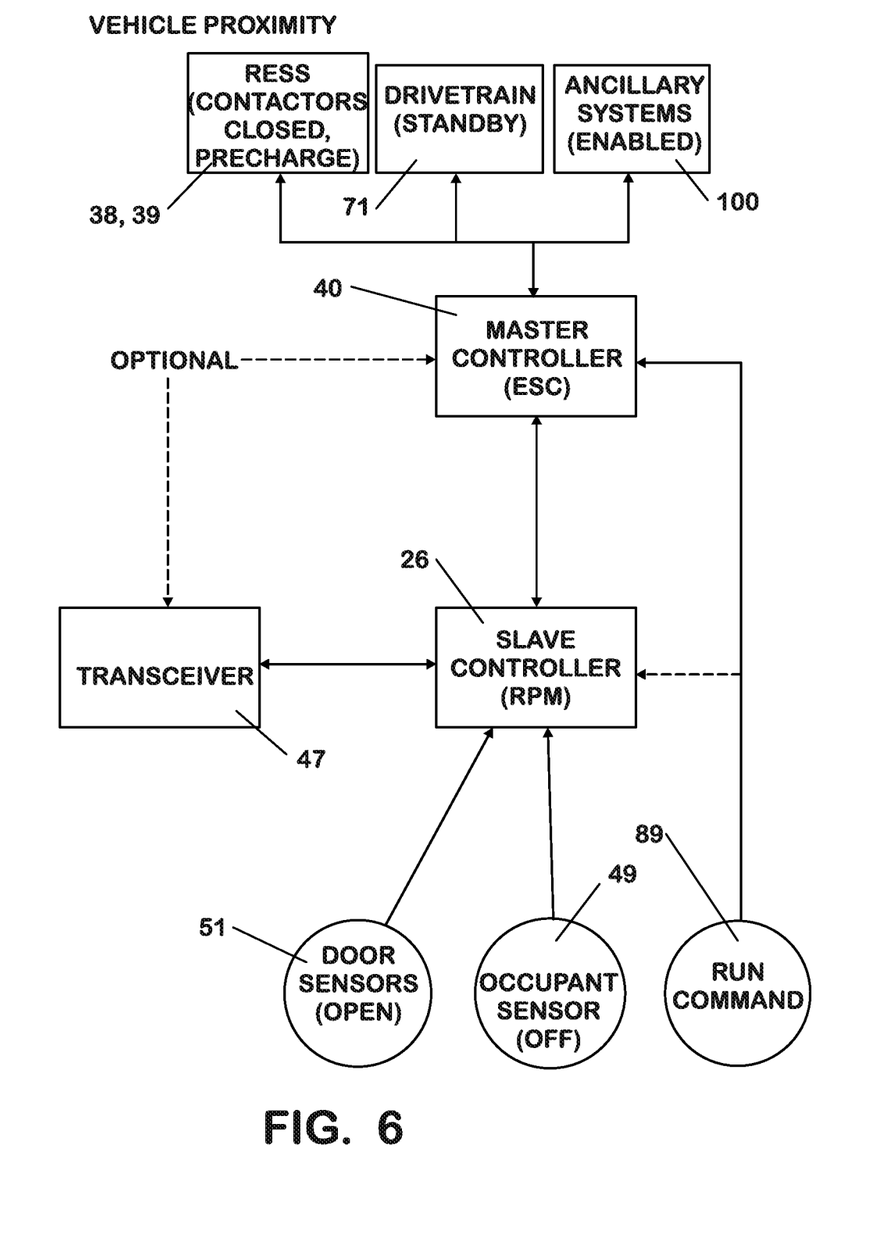
FIG. 6 is a data flow definition of a vehicle proximity mode.
Figure 7:
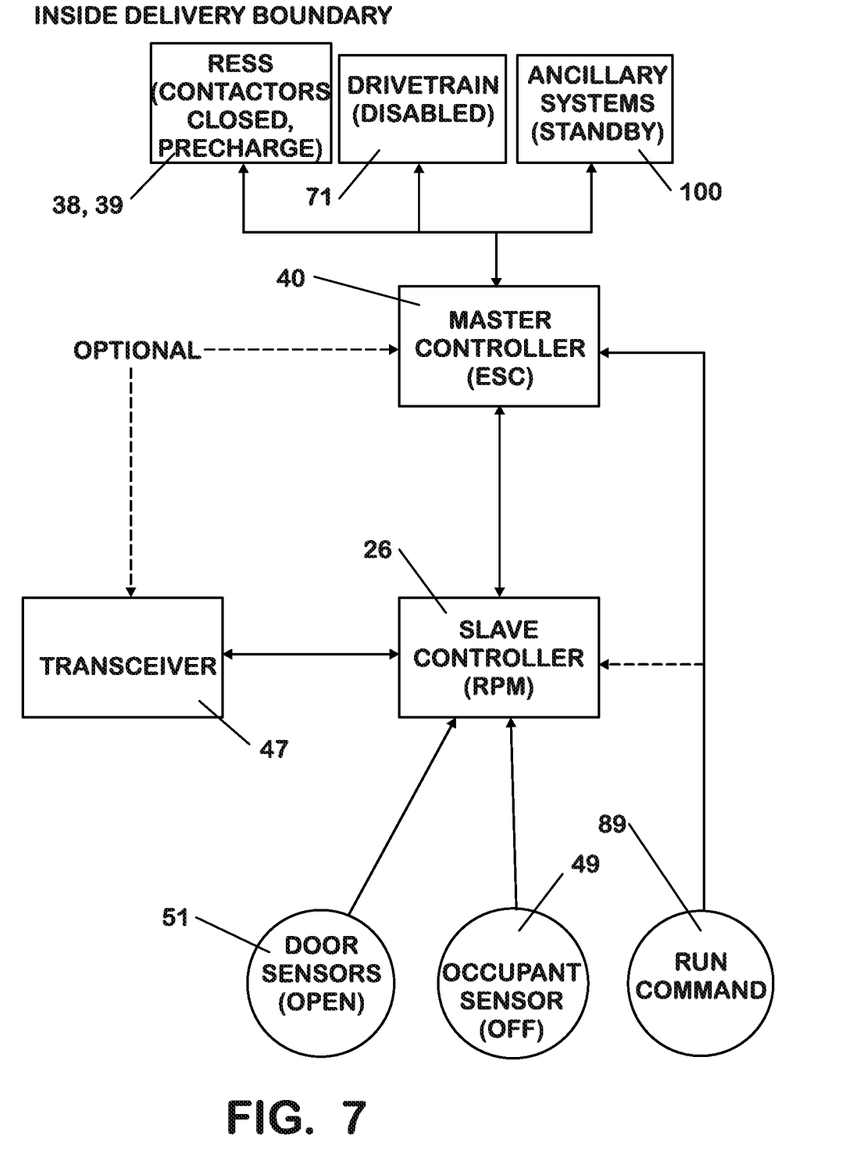
FIG. 7 is a data flow definition of an inside delivery boundary mode.
Figure 8:
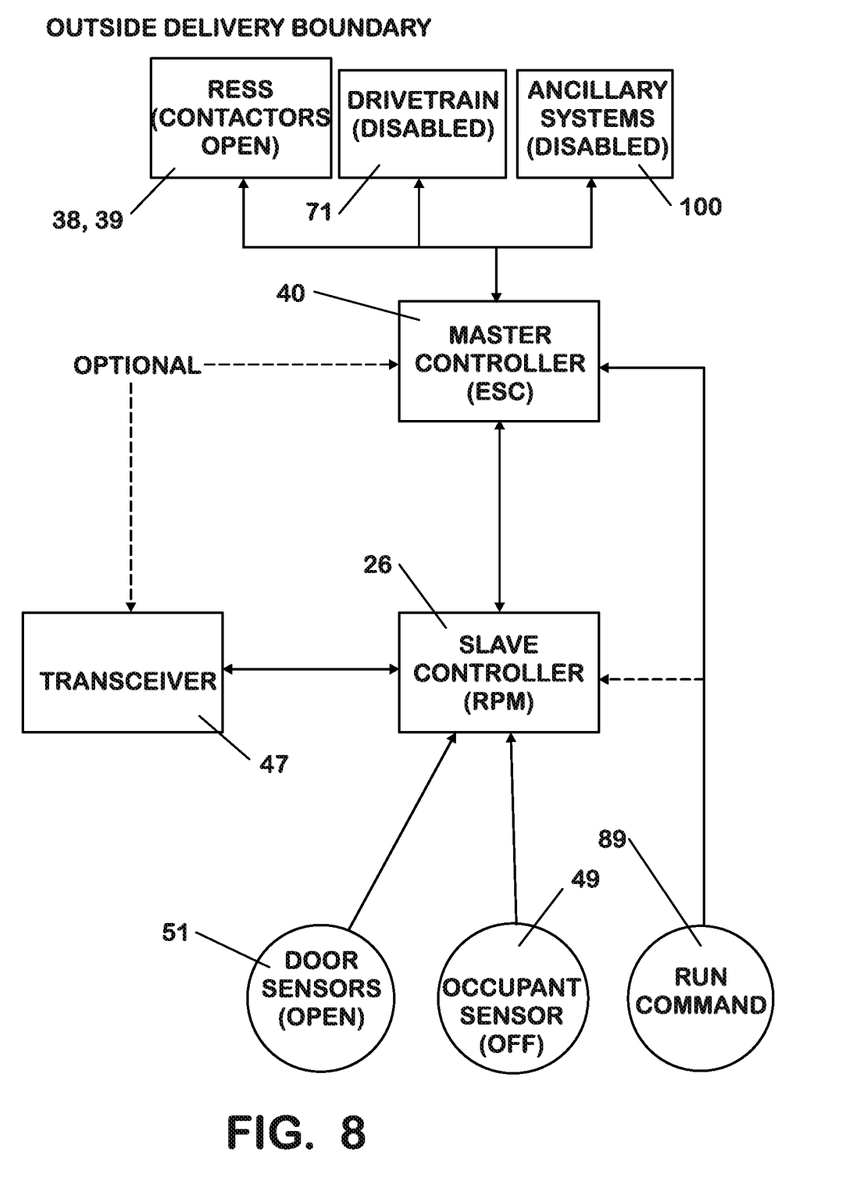
FIG. 8 is a data flow definition of an outside delivery boundary mode.

FIG. 4 graphically illustrates a defined area having a relationship to delivery vehicle 10, in this case boundary conditions centered on the vehicle relating to location of the transponder 75 relative to the vehicle. The boundary conditions define zones with the defined area with the zones corresponding one to one to the states/modes 72, 74, 76 and 78 assumed by the vehicle. A delivery boundary 79 may be defined based on the maximum expected distance that an authorized RFID tag carrier 88 such as a driver will travel from the delivery vehicle 10 (or more precisely transceiver 47) in making his/her rounds. The delivery boundary 79 divides when the "Outside Delivery Boundary" mode 78 is assumed by vehicle 10 from when the "Inside Delivery Area" mode 76 is assumed. Similarly a vehicle proximity boundary 75 divides the "Inside Delivery Boundary" mode 76 from the "Vehicle Proximity" mode 74. Division of the "In-Vehicle" mode 72 from the "Vehicle Proximity" mode 74 is not a strictly driven by distance between the on vehicle transceiver 47, but depends upon status changes in seat sensor 49 and door sensor 51. It should be understood that the boundaries may change as a function of vehicle 10 and service conditions.

FIGS. 5-8 provide a graphical representation of the definition of the four states/modes 72, 74, 76 and 78. The states/modes are assumed by the electrical power distribution system of delivery vehicle 10 in response to changing sensor inputs and distance to transponder 75 measurements.

The In-Vehicle Mode 72 (FIG. 5) provides that the high voltage power distribution sub-system 21 is energized (contactors 67 are closed), the drive train 71 is enabled and the contactors for all high voltage ancillary systems 100 are allowed to be closed. The door sensors 51 indicate all doors are closed and the occupant sensor 49 indicates that the occupant sensor in on. Transceiver 47 will provide distance measurements to the transponder 75 that indicate that the tag is close to the vehicle. The output of the sensors 49, 51 is passed by the slave controller (RPM 26) to the master controller (ESC 40). A run command 89, indicating that the vehicle control is system is to be kept fully enabled, is applied to the master controller/ESC 40. The continued presence of this command relating to all states/modes described indicates that the system is to be kept in a position to respond to changes in the outputs of the sensors 49, 51 and the transceiver 47.

In the Vehicle Proximity Mode 74 (FIG. 6) the high voltage power distribution sub-system 21 is energized, the drive train 71 is disabled (standby) and the contactors for all high voltage ancillary systems 100 are allowed to close. The door sensors 51 indicate at least one door is open and the occupant sensor 49 indicates that the occupant sensor is off. Transceiver 47 will provide distance measurements to the transponder 75 that indicate that the tag is close to the vehicle. The output of the sensors 49, 51 is passed by the slave controller (RPM 26) to the master controller (ESC 40).

In the Inside Delivery Boundary Mode 76 (FIG. 7) the high voltage power distribution sub-system 21 is energized, the drive train 71 is disabled and high voltage ancillary systems 100 are placed on standby. The door sensors 51 indicate at least one door is open and the occupant sensor 49 indicates that the occupant sensor is off Transceiver 47 will provide distance measurements to the transponder 75 that indicate that the tag is outside the vehicle proximity boundary but inside the outside delivery area boundary.

In the Outside Delivery Boundary Mode 78 (FIG. 8) the high voltage power distribution sub-system 21 is cut off by opening of the RESS contactors 67, the drive train 71 and high voltage ancillary systems 100 are disabled. The door sensors 51 indicate at least one door is open and the occupant sensor 49 indicates that the occupant sensor is off. Transceiver 47 will provide distance measurements to the transponder 75 that indicate that the tag is outside the delivery area boundary.

Figure 9:
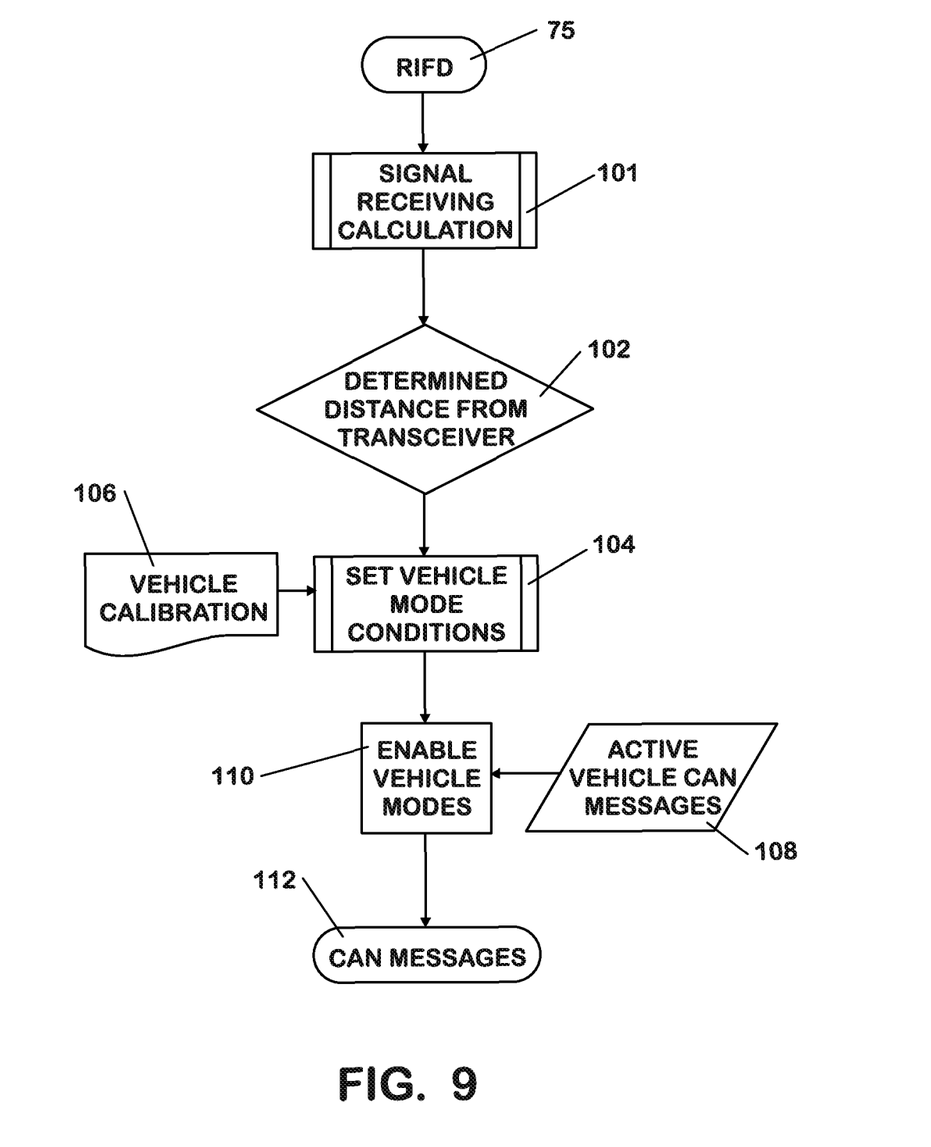
FIG. 9 is a flow chart for a simple proximity architecture.

FIG. 9 is a flow chart reflecting operation of proximity detection of the transponder 75 to be carried by an operator/authorized carrier 88 and its ordered relation to establishing an electrical power distribution system state taking into account a plurality of vehicle calibratable parameters. RFID tags 75 generate response signals to an interrogation signal which upon reception (101) allow for a calculation 102 to determine distance to the tag to occur. The relation of distance to mode conditions is itself programmed. To this end a number of vehicle calibratable parameters 106 may be considered. The parameters that may be used may include transponder 75 RF frequency, the boot time for unenergized control system nodes on the vehicle, which enabled nodes are available, the configuration of the battery pack and its relation to the time taken to charge the power distribution system, the time taken to charge a particular drive train configuration, and the choice of vehicle system enabled through active CAN massages. The vehicle calibration library 106 provides inputs to a set vehicle modes step 104. Modes/states 72, 74, 76 and 78 a representative of modes that may be provided. Active vehicle CAN messages 108 are considered at step 110 against the available modes set at step 104 to enable a vehicle mode. Appropriate responsive CAN messages 112 are then generated to establish and maintain the mode.

Figures 10, 10B:
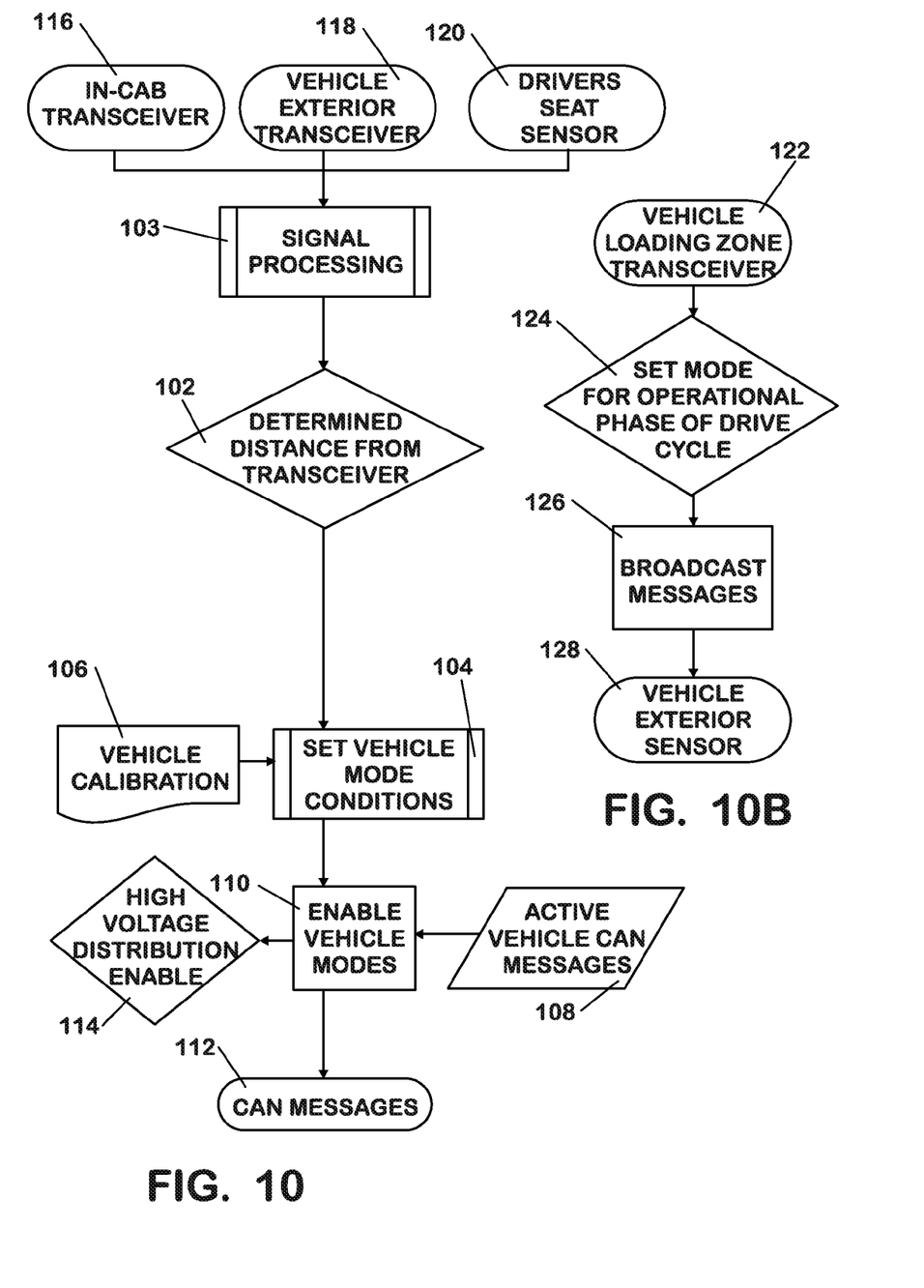
FIG. 10 is a flow chart for an architecture combining other sensor inputs with a proximity architecture.
FIG. 10B is a flow chart for an external proximity sensor.

FIG. 10 is an alternative flow chart relating to establishing states/modes in response to operator location relative to a vehicle and expanded to take into consideration his/her actions. Here operator zone locating functionality is combined with consideration of the other sensors, such as the occupant sensor. A signal processing step 103 is substituted for step 101 of FIG. 9. Step 103 takes into account an input 120 from the driver seat occupant sensor 49, and transponder 75 response signals from either or both of an in-cab transceiver 116 or an transceiver utilizing an outside antenna 118. Signal processing 103 is used to determine driver location inside or outside the vehicle and to provide data to a distance determination step 102. Distance than is input to a set vehicle mode conditions step 104, which also operations on values from the vehicle calibration library 106. The output of step 104 is provided step 110 to enable the vehicle set by step 104. This includes output signals to enable the high voltage distribution system 114, messages over the CAN network (step 112) and receipt of active vehicle CAN messages (step 108).

FIG. 10B reflects modifications to the process specifically for a loading zone transceiver which may or may not be installed on the vehicle 10. Here a vehicle loading zone transceiver signal 122 provides the input to the set mode for operational phase of the drive cycle step 124. Once a state/mode is set messages are broadcast (step 126) for pick up by a vehicle exterior sensor (not shown). The defined area, while still related to vehicle position, may not include the actual location of the vehicle.

What is claimed is:

1. An electrical power system for a vehicle, the electrical power system comprising:
a plurality of high voltage power distribution sub-systems;
a rechargeable energy storage system;
contactors for electrically connecting at least one of the high voltage power distribution sub-systems to the rechargeable energy storage system;
a plurality of electrical loads for energization from the high voltage power distribution sub-systems;
a control network including nodes for controlling the plurality of electrical loads and the contactors;
a portable transponder having a unique identification code;
means for determining location of the portable transponder relative to a defined area; and
means for establishing modes for the vehicle electrical power system being responsive to determined location of the portable transponder.

2. The electrical power system of claim 1, further comprising:
the means for establishing modes for the vehicle electrical power system being further responsive to location of the vehicle.

3. The electrical power system of claim 2, wherein the modes include modes wherein (1) a high voltage power distribution sub-system for a vehicle drive train is energized, a drive train is enabled and the contactors for all high voltage ancillary systems are allowed to be closed, (2) the high voltage power distribution sub-system for the vehicle drive train is energized, the vehicle drive train is disabled and the contactors for the high voltage electrical loads are allowed to close, (3) the high voltage power distribution sub-system for the vehicle drive train is energized, the drive train is disabled and high voltage electrical loads are placed on standby, and (4) the high voltage power distribution sub-system for the drive train is cut off by opening of the contactors, the drive train and high voltage electrical loads are disabled.

4. The electrical power system of claim 3, wherein the determined location of the portable transponder includes locations relative to the vehicle.

5. The electrical power system of claim 4, further comprising:
a wireless interrogator being mounted on the vehicle for communicating with the portable transponder.

6. The electrical power system of claim 4, further comprising:
the portable transponder being a radio frequency identification tag; and
the means for establishing including a transceiver/radio frequency identification tag interrogator.

7. The electrical power system of claim 4, wherein there are at least four zones in the defined area corresponding to transponder location relative to the vehicle including an in-vehicle zone, a vehicle proximate zone, an inside delivery boundary zone and an outside delivery boundary zone with the zones corresponding to modes of the electrical power system.

8. An electrical power system for a vehicle comprising:
a plurality of high voltage power distribution sub-systems;
a rechargeable energy storage system;
contactors for electrically connecting at least one of the high voltage power distribution sub-systems to the rechargeable energy storage system;
a plurality of electrical loads for energization from the high voltage power distribution sub-systems;

a control network including nodes for controlling the plurality of electrical loads and the contactors;

means for establishing modes for the vehicle electrical power system including modes wherein (1) a high voltage power distribution sub-system for a vehicle drive train is energized, a drive train is enabled and the contactors for all high voltage ancillary systems are allowed to be closed, (2) the high voltage power distribution sub-system for the vehicle drive train is energized, the vehicle drive train is disabled and the contactors for the high voltage electrical loads are allowed to close, (3) the high voltage power distribution sub-system for the vehicle drive train is energized, the drive train is disabled and high voltage electrical loads are placed on standby, and (4) the high voltage power distribution sub-system for the drive train is cut off by opening of the contactors, the drive train and high voltage electrical loads are disabled.

9. The electrical power system of claim 8, further comprising:

a portable transponder having a unique identification code;

means for determining location of the portable transponder relative to a defined area; and means for determining vehicle location.

10. The electrical power system of claim 8, the means for establishing modes being responsive to determinations of location of the portable transponder and determination of vehicle location for selecting a mode.

* * * * *